United States Patent [19]
Suzuki et al.

[11] Patent Number: 6,047,770
[45] Date of Patent: Apr. 11, 2000

[54] AIR CONDITIONING APPARATUS FOR VEHICLE

[75] Inventors: Takahisa Suzuki, Kariya; Katsuya Ishii, Anjo; Keiichiro Banzai, Toyota; Akihisa Kokubo, Okazaki, all of Japan

[73] Assignee: Denso Corporation, Kariya, Japan

[21] Appl. No.: 09/120,911

[22] Filed: Jul. 22, 1998

[30]  Foreign Application Priority Data

Jul. 24, 1997  [JP]  Japan ..................................... 9-198831

[51] Int. Cl.[7] .................................................. B60H 3/00
[52] U.S. Cl. ............................ 165/202; 165/42; 62/198; 62/526; 429/624
[58] Field of Search .............................. 165/42, 43, 202; 62/198, 526; 429/624

[56]  References Cited

U.S. PATENT DOCUMENTS

| | | | |
|---|---|---|---|
| 5,501,267 | 3/1996 | Iritani et al. ........................... | 165/43 X |
| 5,641,016 | 6/1997 | Isaji et al. . | |
| 5,899,086 | 5/1999 | Noda et al. ............................ | 165/42 X |

FOREIGN PATENT DOCUMENTS

| | | | |
|---|---|---|---|
| 4014436 | 11/1991 | Germany .................................. | 62/526 |
| 8-34225 | 2/1996 | Japan . | |
| 8-258548 | 10/1996 | Japan . | |

*Primary Examiner*—Christopher Atkinson
*Attorney, Agent, or Firm*—Harness, Dickey & Pierce, PLC

[57]  ABSTRACT

In an air conditioning apparatus for a vehicle, a water/refrigerant heat exchanger is disposed at a refrigerant discharge side of a compressor of a refrigerant cycle, and a cooling unit for cooling a heat-generating unit with refrigerant having an intermediate pressure of the refrigerant cycle is disposed at a downstream refrigerant side of the water/refrigerant heat exchanger. The air conditioning apparatus includes an evaporator and a hot-water type heater core disposed in an air conditioning duct. In a cooling water circuit, an engine, a radiator and an electrical pump are disposed in addition to the water/refrigerant heat exchanger and the hot-water type heater core. Thus, refrigerant absorbs heat generated in the heat-generating unit, and is heat-exchanged with cooling water in the water/refrigerant heat exchanger after passing through the compressor. As a result, the heat-generating unit can be cooled sufficiently even when outside air temperature is high in the summer, and heating capacity can be effectively improved using heat generated from the heat-generating unit in the winter.

10 Claims, 3 Drawing Sheets

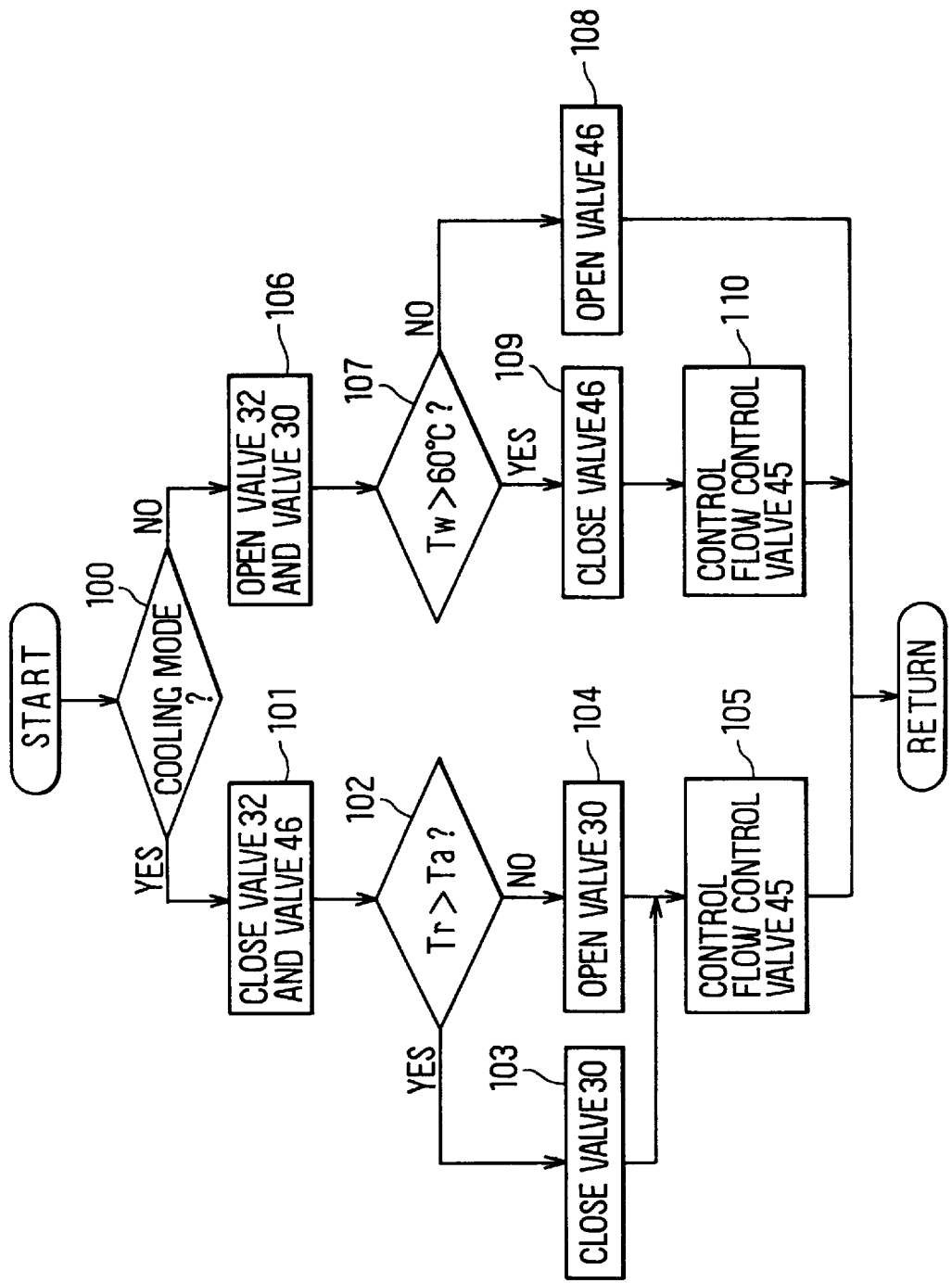

AIR CONDITIONING APPARATUS FOR VEHICLE

CROSS-REFERENCE TO RELATED APPLICATION

This application is related to and claims priority from Japanese Patent Application No. 9-198831 filed on Jul. 24, 1997, the contents of which are hereby incorporated by reference.

BACKGROUND OF THE INVENTION

1. Field of the Invention

The present invention relates to an air conditioning apparatus for a vehicle, which sufficiently cools an electrical unit mounted on the vehicle and effectively utilizes heat generated from the electrical unit. The air conditioning apparatus is suitable for an electrical vehicle and a hybrid vehicle.

2. Description of Related Art

Conventionally, an air conditioning apparatus for heating a passenger compartment in the winter by effectively using heat generated from electrical members mounted on a vehicle is proposed. For example, JP-A-8-258548 discloses an air conditioning apparatus for a vehicle, which heats a passenger compartment using heat generated from electrical members mounted on the vehicle as a heating source of a heat pump. Further, U.S. Pat. No. 5,641,016 discloses an air conditioning apparatus for a vehicle, in which cooling water heated by generation heat from electrical members is heated again in a heat pump to heat a passenger compartment.

However, in the conventional apparatus, the electrical members are cooled by cooling water in the summer, and the cooling water is heat-exchanged with outside air while circulating in a radiator. When the temperature of outside air is higher than 40° C. in the summer, the temperature of cooling water can be increased to 65° C.; and therefore, the electrical members are not cooled sufficiently in the summer.

SUMMARY OF THE INVENTION

In view of the foregoing problems, it is an object of the present invention to provide an air conditioning apparatus for a vehicle, which can sufficiently heat a passenger compartment by effectively using heat generated from a heat-generating unit mounted on the vehicle in the winter, and can sufficiently cool the heat-generating unit in the summer.

According to the present invention, an air conditioning apparatus for a vehicle includes a duct for forming an air passage for leading air toward a passenger compartment, a blower, disposed in the air passage, for blowing air within the duct toward the passenger compartment, a refrigerant cycle, and a cooling water cycle. The refrigerant cycle includes: a compressor for compressing refrigerant; a water/refrigerant heat exchanger for exchanging heat between gas refrigerant discharged from the compressor and cooling water for cooling an engine, to heat the cooling water; a condenser for condensing and cooling refrigerant from the water/refrigerant heat exchanger by performing heat-exchange between the refrigerant from the water/refrigerant heat exchanger and outside air outside the vehicle; a first press-reducing unit for reducing a pressure of liquid refrigerant to an intermediate pressure, the liquid refrigerant being condensed in at least one of the water/refrigerant heat exchanger and the condenser; a cooling unit for cooling a heat-generating unit mounted on the vehicle, in which the intermediate-pressure refrigerant from the first press-reducing unit flows; a second press-reducing unit for reducing a pressure of the intermediate-pressure refrigerant from the cooling unit; and an evaporator disposed in the air passage, for evaporating refrigerant from the second press-reducing unit by absorbing heat from air to cool air. On the other hand, the cooling water cycle includes: a heater core, disposed in the air passage at a downstream air side of the evaporator, for performing heat-exchanger between the cooling water and air to heat air; a radiator for cooling the cooling water by performing heat-exchange between the cooling water and outside air; and a pump for circulating the cooling water in the cooling water cycle. In the air conditioning apparatus, the water/refrigerant heat exchanger and the engine are disposed in the cooling water cycle. Thus, the cooling unit sufficiently cools the heat-generating unit mounted on the vehicle by using the intermediate-pressure refrigerant even when outside air temperature is high in the summer. Further, during a cooling mode in the summer, refrigerant in the refrigerant cycle is directly heat-exhausted by the condenser, and indirectly heat-exhausted by the radiator through the water/refrigerant heat exchanger. Therefore, heat-exhausting capacity of the refrigerant cycle can be improved, and consumption electrical-power of the compressor can be reduced. On the other hand, during a heating mode in the winter, because the cooling water is heated using heat generated from the heat-generating unit through the water/refrigerant heat exchanger, heating capacity for the passenger compartment can be improved even when heat generated in the engine is small or heat is not generated in the engine.

Preferably, the cooling water cooled in the radiator flows into the water/refrigerant heat exchanger when the cooling mode is set. Therefore, during the cooling mode, refrigerant discharged from the compressor can be effectively cooled in the water/refrigerant heat exchanger.

More preferably, the cooling water heated in the water/refrigerant heat exchanger flows into the heater core when the heating mode is set. Therefore, during the heating mode, heating capacity for the passenger compartment can be improved.

BRIEF DESCRIPTION OF THE DRAWINGS

Additional objects and advantages of the present invention will be more readily apparent from the following detailed description of a preferred embodiment when taken together with the accompanying drawings, in which:

FIG. 3 is a flow chart showing a control process of the air conditioning apparatus.

DETAILED DESCRIPTION OF THE PRESENTLY PREFERRED EMBODIMENT

A preferred embodiment of the present invention will be described hereinafter with reference to the accompanying drawings.

Figure 1:
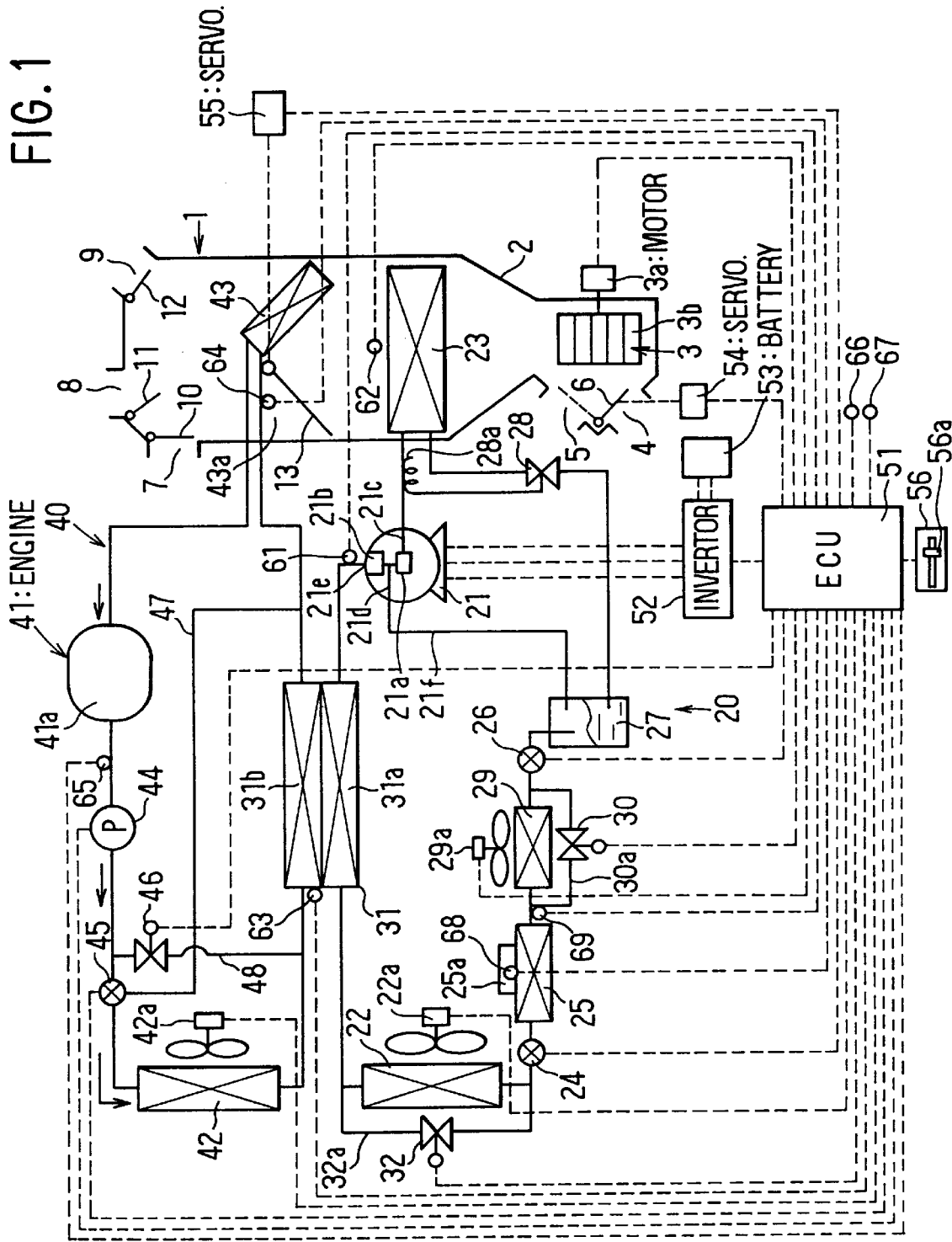
FIG. 1 is a view showing an entire structure of an air conditioning apparatus according to a preferred embodiment of the present invention.

In the embodiment, an air conditioning apparatus of the present invention is applied to a hybrid vehicle (HV) which uses an engine (i.e., internal combustion engine) 41 and a motor (not shown) as a driving source of the vehicle. As shown in FIG. 1, the air conditioning apparatus includes an air conditioning unit 1 disposed under an instrument panel in a passenger compartment. The air conditioning unit 1 has an air conditioning duct 2 for forming an air passage leading air toward a passenger compartment of the vehicle. An inside air intake port 4 for introducing inside air (i.e., air inside the passenger compartment) and an outside air intake port 5 for introducing outside air (i.e., air outside the passenger compartment) are formed at one end side of the air conditioning duct 2, and the inside air intake port 4 and the outside air intake port 5 are selectively opened and closed by an inside/outside air switching door 6. The operation of the inside/outside air switching door 6 is controlled by a servomotor 54.

A blower 3 for blowing air introduced into the air conditioning duct 2 toward the passenger compartment is disposed at a downstream air side of the intake ports 4, 5. The blower 3 includes a motor 3a and a centrifugal fan 3b driven by the motor 3a. On the other hand, at the other end side of the air conditioning duct, there are formed air outlets 7, 8, 9 through which air conditioned in the air conditioning unit 1 is blown toward the passenger compartment. The air outlets 7, 8, 9 are opened and closed by mode switching doors 10, 11, 12, respectively, so that an air outlet mode such as a face mode, a bi-level mode, a foot mode and a defroster mode is set.

An evaporator 23 of a refrigerant cycle 20 is disposed in the air conditioning duct 2 at a downstream air side of the blower 3. Refrigerant flowing through the evaporator 23 absorbs heat from air so that air passing through the evaporator 23 is cooled. A hot-water type heater core 43 is disposed at a downstream air side of the evaporator 23, and heats air passing therethrough using cooling water (hot water) in a cooling water circuit 40 as a heating source.

The heater core 43 is disposed in the air conditioning duct 2 to cross a part of the air passage. Therefore, a bypass passage 43a through which air having passed through the evaporator 23 bypasses the heater core 43 is formed at a side of the heater core 43. Further, an air mixing door 13 is rotatably disposed at an air inlet portion of the heater core 43. The air mixing door 13 adjusts a volume of air passing through the heater core 43 and a volume of air passing through the bypass passage 43a. The rotation amount (i.e., rotation position) of the air mixing door 13 is controlled by a servomotor 55.

Figure 2:
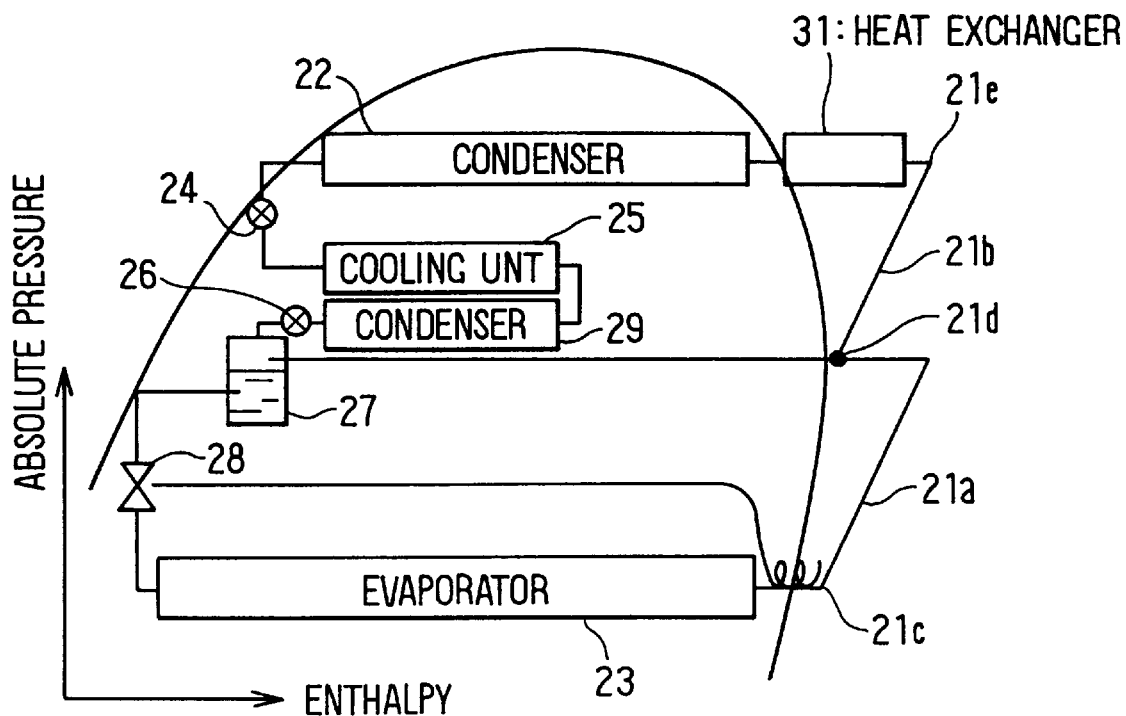
FIG. 2 is a Mollier chart of a refrigerant cycle of the embodiment.

Next, the refrigerant cycle 20 will be now described with reference to FIGS. 1 and 2. A compressor 21 driven by an electrical motor is provided in the refrigerant cycle 20, and a water/refrigerant heat exchanger 31 is provided in the refrigerant cycle 20 at a refrigerant discharging side (i.e., downstream refrigerant side) of the compressor 21. In the water/refrigerant heat exchanger 31, a refrigerant passage 31a through which refrigerant discharged from the compressor 21 flows and a cooling water passage 31a through which cooling water of the cooling water circuit 40 flows are respectively formed. Therefore, gas refrigerant discharged from the compressor 21 is heat-exchanged with cooling water flowing through the cooling water passage 31a in the water/refrigerant heat exchanger 31.

A condenser 22 is provided in the refrigerant cycle 20 at a downstream refrigerant side of the water/refrigerant heat exchanger 31. In the condenser 22, gas refrigerant is heat-exchanged with outside air to be cooled and to be condensed. A bypass passage 32a is provided in parallel with the condenser 22, and is opened and closed by an electromagnetic valve 32. A first electrical expansion valve 24 is disposed at a downstream refrigerant side of the condenser 22 and the bypass passage 32a. By the first electrical expansion valve 24, high-pressure refrigerant is decompressed until a first intermediate pressure. The opening degree of the first electrical expansion valve 24 is electrically controlled so that the first intermediate pressure of the refrigerant reaches to a first target pressure.

A cooling unit 25 is disposed at a downstream refrigerant side of the first electrical expansion valve 24, and cools a heat-generating unit 25a mounted on the vehicle using the first intermediate-pressure refrigerant. In the embodiment, the heat-generating unit 25a is the motor for driving the vehicle, a power-transistor of an invertor for controlling a rotational speed of the motor, and a buttery, for example.

A supplementary condenser 29 is disposed at a downstream refrigerant side of the cooling unit 25. The first intermediate-pressure refrigerant is heat-exchanged with outside air in the supplementary condenser 29, and is condensed. A bypass passage 30a is provided in parallel with the supplementary condenser 29, and is opened and closed by an electromagnetic valve 30.

A second electrical expansion valve 26 is disposed at a downstream refrigerant side of the supplementary condenser 29 and the electromagnetic valve 30. By the second electrical expansion valve 26, the first intermediate-pressure refrigerant is decompressed until a second intermediate pressure. The opening degree of the second electrical expansion valve 26 is controlled until the second intermediate pressure reaches to a second target pressure.

A gas-liquid separator 27 is disposed at a downstream refrigerant side of the second electrical expansion valve 26. The second intermediate-pressure refrigerant is divided into gas refrigerant and liquid refrigerant in the gas-liquid separator 27, and liquid refrigerant is stored therein. Liquid refrigerant separated from gas refrigerant in the gas-liquid separator 27 is decompressed by a thermal expansion valve 28 to a predetermined pressure. The thermal expansion valve 28 includes a temperature sensor 28a for detecting a temperature of refrigerant at an outlet of the evaporator 23. The opening degree of the thermal expansion valve 28 is controlled so that an over-cooling degree of refrigerant at the outlet of the evaporator 23 is maintained at a predetermined degree.

The compressor 21 is a gas-injection type compressor including a low-pressure side compression portion 21a compressing a low-pressure refrigerant sucked from an intake port 21c, and a high-pressure side compression portion 21b. In the high-pressure side compression portion 21b, gas refrigerant compressed to an intermediate pressure and gas refrigerant flowing from a gas injection port 21d are mixed, and the mixed gas refrigerant is compressed to a predetermined pressure and is discharged from an outlet port 21e of the compressor 21.

Alternating current (AC) power is applied to the motor of the compressor 21 by an invertor 52. A frequency of AC power is adjusted by the invertor 52 so that the rotational speed of the motor of the compressor 21 can be continually changed. Direct current (DC) power from a battery 53 mounted on the vehicle is applied to the invertor 52.

On the other hand, a cooling portion 41a of the engine 41 is provided in the cooling water circuit 40. The engine 41 directly or indirectly drives the vehicle. That is, the power of the engine 41 can be directly used for driving the vehicle, and can be used for driving a generator. When the engine 41 is used for driving the generator, generated electrical power of the generator is supplied to a vehicle-driving motor and the battery 53.

In the cooling water circuit 40, there are formed an electrical water pump 44 which can be driven by the battery 53 even when the engine 41 is stopped, a radiator 42 which cools cooling water using outside air, the cooling water passage 31b of the water/refrigerant heat exchanger 31, and the heater core 43. The electrical water pump 44 pumps cooling water so that cooling water flows from the engine 41 toward the radiator as shown by arrow in FIG. 1. Further, in the cooling water circuit 40, a first bypass passage 47 and a second bypass passage 48 are formed. Therefore, cooling water from the electrical water pump 44 bypasses the radiator 42 and the water/refrigerant heat exchanger 31 through the first bypass passage 47, and bypasses the radiator 42 and a flow control valve 45 through the second bypass passage 48. The flow control valve 45 is disposed at a junction between an inlet portion of the radiator 42 and an inlet portion of the first bypass passage 47. Because the flow control valve 45 is a three-way flow type and opening degrees thereof can be electrically controlled, an amount of cooling water flowing through the radiator 42 and an amount of cooling water bypassing the radiator 42 can be continually controlled. On the other hand, an electromagnetic valve 46 for opening and closing the second bypass passage 48 is provided in the second bypass passage 48.

In the embodiment, the air conditioning apparatus includes an electronic control unit (hereinafter referred to as "ECU") 51. The ECU 51 electrically controls an electrical valve such as the flow control valve 45 and the electromagnetic valve 45. Further, the ECU 5 electrically controls the invertor 52, the servomotors 54, 55, the electrical water pump 44, the blower 3 and fans 22a, 29a, 42a, and the like, in addition to the electrical valves.

Signals from various sensors, various levers and various switches are input to the ECU 51. For example, the various sensors are a discharge temperature sensor 61 for detecting a temperature of gas refrigerant discharged from the compressor 21, a post-evaporator sensor 62 for detecting a temperature of air immediately after passing through the evaporator 23, a temperature sensor 63 for detecting a temperature of cooling water at an inlet of the water/refrigerant heat exchanger 31, a heater-core water temperature sensor 64 for detecting a temperature of cooling water at a water inlet of the heater core 43, an engine cooling-water temperature sensor 65 for detecting a temperature of cooling water at a water outlet of the engine cooling portion 41a, an outside air temperature sensor 66 for detecting a temperature of outside air, an inside air temperature sensor 67 for detecting a temperature of inside air inside the passenger compartment, a temperature sensor 68 for detecting the temperature of the heat-generating unit 25a, an intermediate-pressure refrigerant temperature sensor 69 for detecting a temperature of refrigerant from the cooling unit 25. The various levers include a temperature control lever 56 of a control panel 56, for example.

Next, control process of the air conditioning apparatus will be now described.

Firstly, when an air-conditioning operation switch (not shown) of the control panel 56 is turned on, the control routine of ECU 51 shown in FIG. 3 starts. Then, at step 100, it is determined whether or not an operation mode of the air conditioning unit is a cooling mode or a heating mode. That is, it is determined whether or not the temperature control lever 56a of the control panel 56 is positioned at a lower temperature side or a high temperature side. When the cooling mode is determined at step 100, the electromagnetic valve 32 of the refrigerant cycle 20 and the electromagnetic valve 46 of the cooling water circuit 40 are closed at step 101. When the engine 41 is operated in a general-load condition during the cooling mode, the temperature of cooling water flowing into the water/refrigerant heat exchanger 31 is approximately 60° C. by the heat radiation of the radiator 42, and the temperature of gas refrigerant discharged from the compressor 21 is approximately 80° C.

During the cooling mode, because the temperature of the cooling water flowing through the cooling water passage 31b is lower than that of the refrigerant flowing through the refrigerant passage 31a in the water/refrigerant heater exchanger 31, high-temperature high-pressure refrigerant discharged from the compressor 21 is cooled while passing through the water/refrigerant heat exchanger 31. As a result, a part of gas refrigerant discharged from the compressor 21 is condensed in the refrigerant passage 31a of the water/refrigerant heat exchanger 31. Because the electromagnetic valve 32 of the refrigerant cycle is closed during the cooling mode at step 101, refrigerant having passed through the refrigerant passage 31a of the water/refrigerant heat exchanger 31 is cooled and condensed in the condenser 22 by outside air.

The condensed liquid refrigerant having a high temperature and a high pressure is decompressed (i.e., press-reduced) in the first electrical expansion valve 24 until the first intermediate pressure to become in a gas-liquid two-phase state. Gas-liquid two-phase refrigerant from the first electrical expansion valve 24 flows through the cooling unit 25 to cool the heat-generating unit 25a mounted on the vehicle. That is, in the cooling unit 25, liquid refrigerant in gas-liquid two-phase refrigerant absorbs heat from the heat-generating unit 25a to cool the heat-generating unit 25a. Therefore, the temperature of the first intermediate-pressure refrigerant is controlled by the first electrical expansion valve 24 according to a heat-generating amount of the heat-generating unit 25a so that the temperature of heat-generating unit 25a, detected by the cooling water temperature sensor 68, can be controlled at a predetermined temperature (e.g., 5° C.).

That is, when the heat-generating amount of the heat-generating unit 25a becomes larger, the opening degree of the first electrical expansion valve 24 is made smaller (i.e., a restriction amount of the expansion valve 24 is made larger), and the temperature of the first intermediate-pressure refrigerant is made lower. On the other hand, when the heat-generating amount of the heat-generating unit 25a becomes smaller, the opening degree of the first electrical expansion valve 24 is made larger (i.e., a restriction amount of the expansion valve 24 is made smaller), and the temperature of the first intermediate-pressure refrigerant is made higher. Thus, even when the heat-generating amount of the heat-generating unit 25a mounted on the vehicle and the temperature of outside air are changed, the heat-generating unit 25a can be sufficiently cooled.

Further, at step 102, when the refrigerant temperature (Tr) detected by an intermediate-pressure refrigerant temperature sensor 69 is higher than the outside air temperature (Ta), the electromagnetic valve 30 is closed at step 103. Therefore, first intermediate-pressure refrigerant from the cooling unit 25 flows into the supplementary condenser 29, and is heat-exchanged with outside air to be cooled and condensed. Conversely, when the refrigerant temperature (Tr) detected by the intermediate-pressure refrigerant temperature sensor 69 is lower than the outside air temperature (Ta) at step 102, the electromagnetic valve 30 is opened at step 104. Therefore, the first intermediate-pressure refrigerant from the cooling unit 25 passes through the bypass passage 30 while bypassing the supplementary condenser 29, and flows into the second electrical expansion valve 26. Because first intermediate-pressure refrigerant passes through the bypass passage 30 while bypassing the supplementary condenser 29 when the temperature (Tr) of first intermediate-pressure refrigerant is lower than the outside air temperature (Ta), it is prevent the first intermediate-pressure refrigerant from absorbing heat from outside air.

The first intermediate-pressure refrigerant is decompressed in the second electrical expansion valve 26 until the second intermediate pressure, and thereafter flows into the gas-liquid separator 27. Gas refrigerant is separated from liquid refrigerant in the gas-liquid separator 27, and is sucked into the compressor 21 from a gas-injection port 21d through a gas-injection pipe 21f. On the other hand, liquid refrigerant from the gas-liquid separator 27 is decompressed in the thermal expansion valve 28 at a predetermined pressure, and flows into the evaporator 23. The thermal expansion valve 28 controls the flow rate of refrigerant in such a manner that refrigerant is completely vaporized at a refrigerant outlet of the evaporator 23.

Within the air conditioning unit 1, air blown by a blower 3 is heat-exchanged with refrigerant in the evaporator 23 to be cooled, and cool air is blown toward the passenger compartment during the cooling mode. Here, liquid refrigerant is vaporized in the evaporator 23, the vaporized gas refrigerant is sucked into the compressor 21 from the intake port 21c, and is compressed in the compressor 21. FIG. 2 shows each refrigerant state in each equipment of the refrigerant cycle 20.

Figure 4:
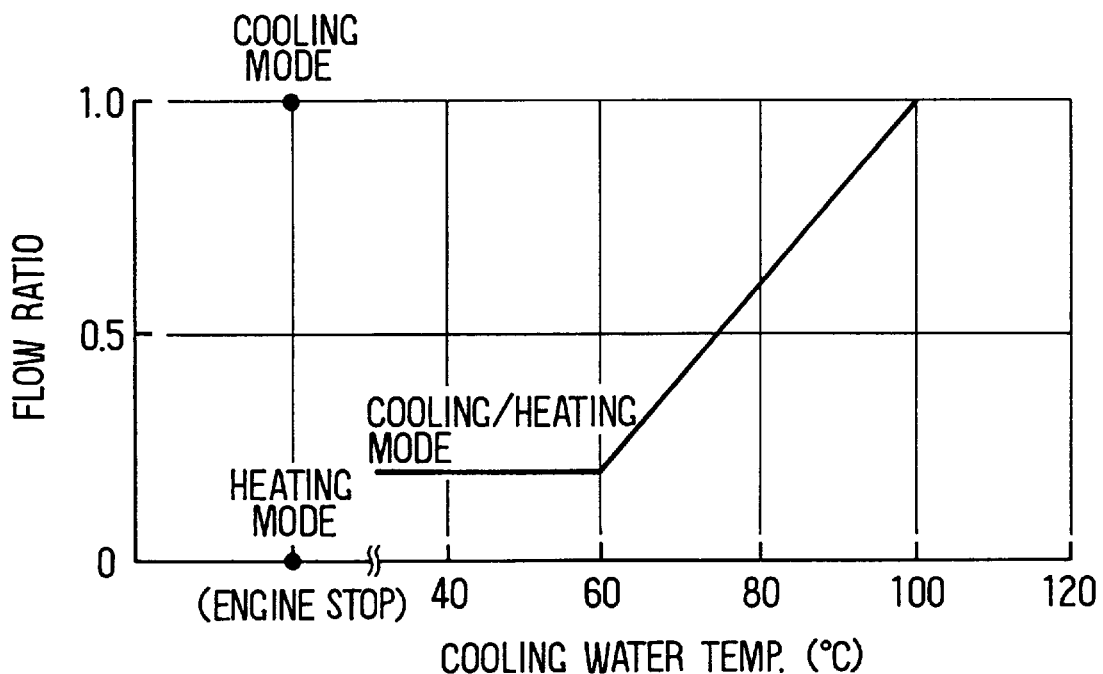
FIG. 4 is a graph showing the relationship between a flow ratio of cooling water passing through a radiator to a total cooling water and a temperature of cooling water at an outlet of an engine.

Next, during the cooling mode, the operation of the cooling water circuit 40 will be described with reference to FIG. 4. In FIG. 4, the abscissa shows the cooling water temperature, at the outlet of the engine cooling portion 41a, detected by the engine cooling-water temperature sensor 65, and the ordinate shows a flow ratio (hereinafter, referred to as "radiator-passing flow ratio") of refrigerant flowing through the radiator 42 to a total refrigerant flowing through the flow control valve 45. The control program shown in FIG. 4 is set beforehand, and is stored in a ROM of a microcomputer of the ECU 51. During the cooling mode, because, the electromagnetic valve 46 of the bypass passage 48 is closed, the radiator-passing flow ratio of refrigerant can be controlled by the flow control valve 45.

At step 105 in FIG. 3, the radiator-passing flow ratio corresponding to cooling water temperature at the outlet of the engine cooling portion 41a is determined according to the control program shown in FIG. 4, and the flow control valve 45 is controlled according to the radiator-passing flow ratio.

Further, when the engine 41 is stopped during the cooling mode, the flow control valve 45 fully closes the bypass passage 47 and fully opens the inlet passage of the radiator 42 so that the radiator-passing flow ratio is equal to 1. Therefore, all cooling water from the electrical water pump 44 passes through the flow control valve 45 and flows into the radiator 42. Thus, cooling water is heat-exchanged with outside air in the radiator 42 to be cooled. The cooled cooling water flows into the cooling water passage 31b of the water/refrigerant heat exchanger 31, and is heat-exchanged with gas refrigerant discharged from the compressor 21 of the refrigerant cycle 20 to cool gas refrigerant from the compressor 23. Cooling water heated in the water/refrigerant heat exchanger 31 returns the electrical water pump 44 after passing through the heater core 43 and the engine cooling water portion 41a. During the cooling mode, because the air mixing door 13 closes the air inlet of the heater core 43, cooling water flowing through the heater core 43 is not heat-exchanged with air.

During the cooling mode, because the electromagnetic valve 46 is closed even when the engine 41 operates, cooling water from the electrical water pump 44 flows into the flow control valve 45. Thereafter, the flow control valve 45 controls the radiator-passing flow ratio of cooling water according to the control program shown in FIG. 4, so that the flow rate of cooling water passing through the radiator 42 and the flow rate of cooling water bypassing the radiator 42 are controlled. Cooling water is cooled in the radiator 42 while passing through the radiator 42, and flows into the water/refrigerant heat exchanger 31. The cooling water is heat-exchanged in the water/refrigerant heat exchanger 31 with gas refrigerant discharged from the compressor 21. On the other hand, cooling water passing through the bypass passage 47 while bypassing the radiator 42 is joined with cooling water having passed through the radiator 42 and the water/refrigerant heat exchanger 31 at a cooling water outlet of the water/refrigerant heat exchanger 31. The joined cooling water returns the electrical water pump 44 through the heater core 43 and the engine cooling portion 41a. At this time, because the air mixing door 13 closes the air inlet of the heater core 43, cooling water is not heat-exchanged with air during the cooling mode.

By the above-described operation, air blown by the blower 3 is cooled by the evaporator 23, and is blown toward the passenger compartment without passing through the heater core 43 to cool the passenger compartment. At this time, the heat-generating unit 25a mounted on the vehicle is cooled to a predetermined temperature by first intermediate-pressure refrigerant, regardless of a variation in the outside air temperature and the heat-generating amount of the heat-generating unit 25a. Therefore, the heat-generating unit 25a can be sufficiently cooled even when the outside air temperature is high in the summer.

Further, heat from the high-pressure high-temperature refrigerant of the refrigerant cycle 20 is transmitted to cooling water in the water/refrigerant heat exchanger 31, and the cooling water is heat-exchanged with outside air in the radiator 42. Therefore, refrigerant is cooled in the water/refrigerant heat exchanger 31 and the condenser 22. Thus, even when refrigerant heating-load due to the generation heat of the heat-generating unit 25a is increased in the refrigerant cycle 20, the pressure of refrigerant discharged from the compressor can be reduced to prevent consumption electrical power of the compressor 21 from being increased.

When dehumidifying operation is performed, the air mixing door 13 is rotated at a predetermined position so that a part of air having passed through the evaporator 23 is heated in the heater core 43 while passing through the heater core 43. Therefore, cool air having a predetermined temperature is blown toward the passenger compartment.

Next, when a heating mode is determined at step 100 in FIG. 3 (i.e., the determination is "NO" at step 100), the both the electromagnetic valves 30, 32 are opened. When the engine 41 stops in long time or heat generated in the engine 41 is small even when the engine 41 operates, the temperature of cooling water is low. In this case, because heat generated in the engine 41 is too small to heat cooling water, the heating capacity for the passenger compartment is insufficient only using the cooling water from the engine 41. Thus, in the embodiment, the refrigerant cycle 20 is operated to heat cooling water. That is, the compressor 21 is operated, and gas refrigerant discharged from the compressor 21 is heat-exchanged with cooling water in the water/refrigerant heat exchanger 31. As a result, gas refrigerant discharged from the compressor 21 is cooled, and cooling water is heated in the water/refrigerant heat exchanger 31.

During the heating mode, because the electromagnetic valve 32 is opened at step 106 in FIG. 3, refrigerant from the water/refrigerant heat exchanger 31 passes through the bypass passage 32a while bypassing the condenser 22. Therefore, gas refrigerant discharged from the compressor 21 is cooled and condensed only in the water/refrigerant heat exchanger 31 to heat cooling water, and is decompressed in the first electrical expansion valve 24 until a first intermediate pressure. Thus, refrigerant decompressed to the first intermediate pressure cools the heat-generating unit 25a mounted on the vehicle.

Because the electromagnetic valve 30 is also opened during the heating mode, refrigerant from the cooling unit 25 passes through the bypass passage 30a and is decompressed until a second intermediate pressure in the second electrical expansion valve 26. Second intermediate-pressure refrigerant flows into the gas-liquid separator 27 to be separated into gas refrigerant and liquid refrigerant. Liquid refrigerant from the gas-liquid separator 27 is press-reduced by the thermal expansion valve 28, and the press-reduced refrigerant passes through the evaporator 23 while absorbing heat from air within the air conditioning duct 2. Gas refrigerant vaporized in the evaporator 23 is sucked into the compressor 21 from the intake port 21c. Simultaneously, gas refrigerant from the gas-liquid separator 27 is sucked into the compressor 21 from the injection port 21d through the injection passage 21f.

On the other hand, cooling water pumped from the electrical water pump 44 circulates in the cooling water circuit 40. In this case, it is determined whether or not the cooling water temperature (Tw) detected by the engine cooling-water temperature sensor 65 is higher than a predetermined temperature (e.g., 60° C.) at step 107 in FIG. 3. When the cooling water temperature (Tw) is lower than the predetermined temperature (e.g., 60° C.), the electromagnetic valve 46 is opened at step 108. Thus, cooling water from the electrical water pump 44 flows into the water/refrigerant heat exchanger 31 through the bypass passage 48 while bypassing the radiator 42. Cooling water is heat-exchanged with gas refrigerant discharged from the compressor 21 in the water/refrigerant heat exchanger 31; and therefore, gas refrigerant is cooled and condensed while cooling water is heated.

Cooling water heated in the water/refrigerant heat exchanger 31 directly flows into the heater core 43. Because the air mixing door 13 closes the bypass passage 43a and opens the air inlet of the heater core 43 during the heating mode, all air blown by the blower 3 is heat-exchanged with cooling water to be warm air, and the warm air is blown toward the passenger compartment. Cooling water from the heater core 43 passes through the engine cooling portion 41a and returns the electrical water pump 44.

Even when the engine 41 is temporarily stopped during the heating mode, when the cooling water temperature (Tw) is higher than the predetermined temperature (e.g., 60° C.), the electromagnetic valve 46 is closed at step 109. Therefore, at step 110, the flow control valve 45 controls the radiator-passing flow ratio according to the control program shown in FIG. 4.

As shown in FIG. 4, when the engine 41 is stopped during the heating mode, the radiator-passing flow ratio becomes zero. Therefore, the flow control valve 45 fully opens the bypass passage 47 and fully closes the inlet passage of the radiator 42. Thus, in this case, all cooling water from the electrical water pump 44 passes through the flow control valve 45, and directly flows into a cooling water passage at an outlet side of the water/refrigerant heat exchanger 31 through the bypass passage 47 while bypassing through the water/refrigerant heat exchanger 31. That is, in this case, cooling water from the electrical water pump 44 directly flows into the heater core 43 without passing through the radiator 42 and the water/refrigerant heat exchanger 31, and returns the electrical water pump 44 through the engine cooling portion 41a. Therefore, air passing through the heater core 43 is heated and the heated air is blown toward the passenger compartment.

During the heating mode, refrigerant flowing through the evaporator 23 of the refrigerant cycle 20 absorbs heat from air passing through the evaporator 23 to cool air, and absorbs heat from the heat-generating unit 25a to cool the heat-generating unit 25a. The heat-absorbed refrigerant is compressed by the compressor 21, and refrigerant discharged from the compressor 21 is heat-exchanged with cooling water in the water/refrigerant heat exchanger 31. Cooling water is heated in the water/refrigerant heat exchanger 31 and further heated by heat generated from the engine 41. As a result, even when the engine 41 is stopped in a long time or heat generated by the operation of the engine 41 is small, heat generated from the heat-generating unit 25a is effectively used to improve the heating capacity for the passenger compartment.

Further, when heat generated in the engine 41 is large so that the cooling water temperature (Tw) is higher than a predetermined temperature during operation of the engine 41, the heating mode is performed by heat generated in the engine 41 similarly to a gasoline-engine vehicle. Therefore, in this case, cooling water heated in the engine cooling portion 41a is pumped by the electrical water pump 44, and is divided into cooling water passing through the radiator 42 and cooling water flowing through the bypass passage 47 by the flow control valve 45 according to the cooling-water temperature (Tw). Cooling water is cooled while passing through the radiator 42, and flows into the water/refrigerant heat exchanger 31. In the water/refrigerant heat exchanger 31, cooling water is heat-exchanged with refrigerant discharged from the compressor 21 to be heated. On the other hand, cooling water passing through the bypass passage 47 is directly flows into the water passage at the outlet side of the water/refrigerant heat exchanger 31 without passing through the radiator 42 and the water/refrigerant heat exchanger 31. Therefore, cooling water having passed through the radiator 42 and the water/refrigerant heat exchanger 31 and cooling water bypassing the radiator 42 and water/refrigerant heat exchanger 31 are joined in the water passage at the outlet side of the water/refrigerant heat exchanger 31, and the joined water flows into the heater core 43. Because the air mixing door 13 opens the air inlet of the heater core 43 and closes the bypass passage 43a during the heating mode, air blown by the blower 3 is heated while passing through the heater core 43, and heated warm air is blown toward the passenger compartment. Cooling water having been heat-exchanged with air in the heater core 43 returns the engine cooling portion 41a.

Even when the engine stops, because the refrigerant cycle 20 is operated, the heat-generating unit 25a mounted on the vehicle can be cooled sufficiently. On the other hand, when the generation heat of the engine 41 is sufficient, the heating mode is performed by heat generated in the engine 41 while the heat-generating unit 25a mounted on the vehicle is sufficiently cooled by the operation of the refrigerant cycle 20.

As described above, during the cooling mode, because the cooling operation of the heat-generating unit 25a mounted on the vehicle is performed by the intermediate-pressure refrigerant, the heat-generating unit 25 can be sufficiently cooled even when the outside air temperature is higher than 40° C. in the summer.

Further, because refrigerant is heat-exchanged with cooling water through the water/refrigerant heat exchanger 31, refrigerant in the refrigerant cycle 20 can be cooled indirectly by the radiator 42 through the water/refrigerant heat exchanger 31, during the cooling mode. Therefore, radiating capacity of the refrigerant cycle 20 can be improved, and consumption electrical power of the compressor 21 can be decreased. Further, in a cool-down state during the cooling mode, cooling capacity for the passenger compartment can be improved. On the other hand, because cooling water is heated by heat generated in the heat-generating unit 25a during the heating mode, the heating mode can be performed even when the engine 41 is not operated.

Although the present invention has been fully described in connection with the preferred embodiment thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning apparatus for a vehicle having a passenger compartment and an engine for driving the vehicle, said air conditioning apparatus comprising:
    a duct for forming an air passage for leading air toward the passenger compartment;
    a blower, disposed in the air passage, for blowing air within said duct toward the passenger compartment;
    a refrigerant cycle including
        a compressor for compressing refrigerant,
        a water/refrigerant heat exchanger for exchanging heat between gas refrigerant discharged from said compressor and cooling water for cooling the engine, to heat the cooling water,
        a condenser for condensing and cooling refrigerant from said water/refrigerant heat exchanger by performing heat-exchange between the refrigerant from said water/refrigerant heat exchanger and outside air outside the vehicle,
        a first press-reducing unit for reducing a pressure of liquid refrigerant to an intermediate pressure, the liquid refrigerant being condensed in at least one of said water/refrigerant heat exchanger and said condenser,
        a cooling unit for cooling a heat-generating unit mounted on the vehicle, using the intermediate-pressure refrigerant from said first press-reducing unit,
        a second press-reducing unit for reducing a pressure of the intermediate-pressure refrigerant from said cooling unit, and
        an evaporator disposed in said air passage, for evaporating refrigerant flowing from said second press-reducing unit by heat from air to cool air; and
    a cooling water cycle in which the cooling water circulates, said cooling water cycle includes
        a heater core, disposed in said air passage at a downstream air side of said evaporator, for performing heat-exchange between the cooling water and air to heat air,
        a radiator for cooling the cooling water by performing heat-exchange between the cooling water and outside air, and
        a pump for circulating the cooling water in said cooling water cycle,
    wherein said water/refrigerant heat exchanger and the engine are disposed in said cooling water cycle.

2. The air conditioning apparatus according to claim 1, wherein
    said refrigerant cycle further includes
        a supplementary condenser, disposed at a downstream refrigerant side of said cooling unit, for performing heat-exchange between the intermediate-pressure refrigerant and outside air,
        a first bypass passage through which refrigerant from said cooling unit bypasses said supplementary condenser, and
        a first opening/closing valve for opening and closing said first bypass passage.

3. The air conditioning apparatus according to claim 2, further comprising:
    refrigerant temperature detecting means for detecting a temperature of the intermediate-pressure refrigerant from said cooling unit; and
    outside air temperature detecting means for detecting a temperature of outside air outside the vehicle,
    wherein said first opening/closing valve opens said first bypass passage in such a manner that the intermediate-pressure refrigerant from said cooling unit bypasses said supplementary condenser, when the temperature of the intermediate-pressure refrigerant, detected by said refrigerant temperature detecting means, is lower than the temperature of outside air.

4. The air conditioning apparatus according to claim 2, wherein said first opening/closing valve opens said first bypass passage in such a manner that the intermediate-pressure refrigerant from said cooling unit bypasses said supplementary condenser, when a heating mode for heating the passenger compartment is set.

5. The air conditioning apparatus according to claim 1, wherein the cooling water cooled in said radiator flows into said water/refrigerant heat exchanger, when a cooling mode for cooling the passenger compartment is set.

6. The air conditioning apparatus according to claim 1, wherein cooling water heated in said water/refrigerant heat exchanger flows into said heater core, when a heating mode for heating the passenger compartment is set.

7. The air conditioning apparatus according to claim 1, further comprising
    cooling-water temperature detecting means for detecting a temperature of the cooling water circulating in said cooling water cycle, wherein:
    said cooling water cycle further includes
        a second bypass passage through which the cooling water bypasses the radiator, and
        a second opening/closing valve for opening and closing said second bypass passage; and
    said second opening/closing valve opens said second bypass passage in such a manner that the cooling water bypasses the radiator, when the temperature of cooling water is lower than a predetermined temperature when a heating mode for heating the passenger compartment is set.

8. The air conditioning apparatus according to claim 1, further comprising
    cooling-water temperature detecting means for detecting a temperature of the cooling water circulating in said cooling water cycle, wherein the cooling water cycle further includes a flow control valve for controlling a ratio between a volume of cooling water passing through said radiator and a volume of cooling water bypassing said radiator according to the temperature of cooling water.

9. An air conditioning apparatus for a vehicle having a passenger compartment and an engine for driving the vehicle, said air conditioning apparatus comprising:

a duct for forming an air passage for leading air toward the passenger compartment;

a blower, disposed in the air passage, for blowing air within said duct toward the passenger compartment;

a refrigerant cycle including
  a compressor for compressing refrigerant, said compressor having a first compression portion for compressing gas refrigerant sucked from an intake port thereof from a low pressure to an intermediate pressure, and a second compression portion for compressing refrigerant from said first compression portion and from an injection port thereof and for discharging the compressed refrigerant from an outlet port thereof,
  a water/refrigerant heat exchanger for exchanging heat between gas refrigerant discharged from said compressor and cooling water for cooling the engine, to heat the cooling water,
  a condenser for condensing and cooling refrigerant from said water/refrigerant heat exchanger by performing heat-exchange between the refrigerant from said water/refrigerant heat exchanger and outside air outside the vehicle,
  a first press-reducing unit for reducing a pressure of liquid refrigerant to an intermediate pressure, the liquid refrigerant being condensed in at least one of said water/refrigerant heat exchanger and said condenser,
  a cooling unit for cooling a heat-generating unit mounted on the vehicle, using the intermediate-pressure refrigerant from said first press-reducing unit,
  a gas-liquid separator, disposed at a downstream refrigerant side of said cooling unit, for separating liquid refrigerant and gas refrigerant,
  a second press-reducing unit for reducing a pressure of liquid refrigerant from said gas-liquid separator,
  an evaporator disposed in said air passage, for evaporating refrigerant flowing from said second press-reducing unit by heat from air to cool air, and
  a gas refrigerant passage through which gas refrigerant from said gas-liquid separator is introduced into the injection port of said second compression port; and a cooling water cycle in which the cooling water circulates, said cooling water cycle includes
  a heater core, disposed in said air passage at a downstream air side of said evaporator, for performing heat-exchange between the cooling water and air to heat air,
  a radiator for cooling the cooling water by performing heat-exchange between the cooling water and outside air, and
  a pump for circulating the cooling water in said cooling water cycle,
wherein said water/refrigerant heat exchanger and the engine are disposed in said cooling water cycle.

10. An air conditioning apparatus for a vehicle having a passenger compartment and an engine for driving the vehicle, said air conditioning apparatus comprising:

a duct for forming an air passage for leading air toward the passenger compartment;

a compressor for compressing refrigerant;

a water/refrigerant heat exchanger for exchanging heat between the refrigerant discharged from said compressor and cooling water for cooling the engine, to heat the cooling water;

a condenser for condensing and cooling refrigerant from said water/refrigerant heat exchanger by performing heat-exchange between the refrigerant from said water/refrigerant heat exchanger and outside air outside the vehicle;

a first press-reducing unit for reducing a pressure of liquid refrigerant to an intermediate pressure, the liquid refrigerant being condensed in at least one of said water/refrigerant heat exchanger and said condenser;

a cooling unit for cooling a heat-generating unit mounted on the vehicle, using the intermediate-pressure refrigerant from said first press-reducing unit;

a second press-reducing unit for reducing a pressure of the intermediate-pressure refrigerant from said cooling unit;

an evaporator disposed in said air passage, for evaporating refrigerant flowing from said second press-reducing unit by heat from air to cool air to be blown the passenger compartment;

a heater core, disposed in said air passage at a downstream air side of said evaporator, for performing heat-exchange between the cooling water and air to heat air to be blown toward the passenger compartment; and a radiator for cooling the cooling water by performing heat-exchange between the cooling water and outside air, wherein:

the cooling water from said radiator flows into said heater core through said water/refrigerant heat exchanger while said cooling unit cools the heat-generating unit using the intermediate-pressure refrigerant, when a cooling mode for cooling the passenger compartment is set; and the cooling water heated in said water/refrigerant heat exchanger directly flows into said heater core, when a heating mode for heating the passenger compartment is set.

* * * * *